April 8, 1952     A. CHILTON     2,592,119
AIRCRAFT ENGINE
Filed July 11, 1947     2 SHEETS—SHEET 1
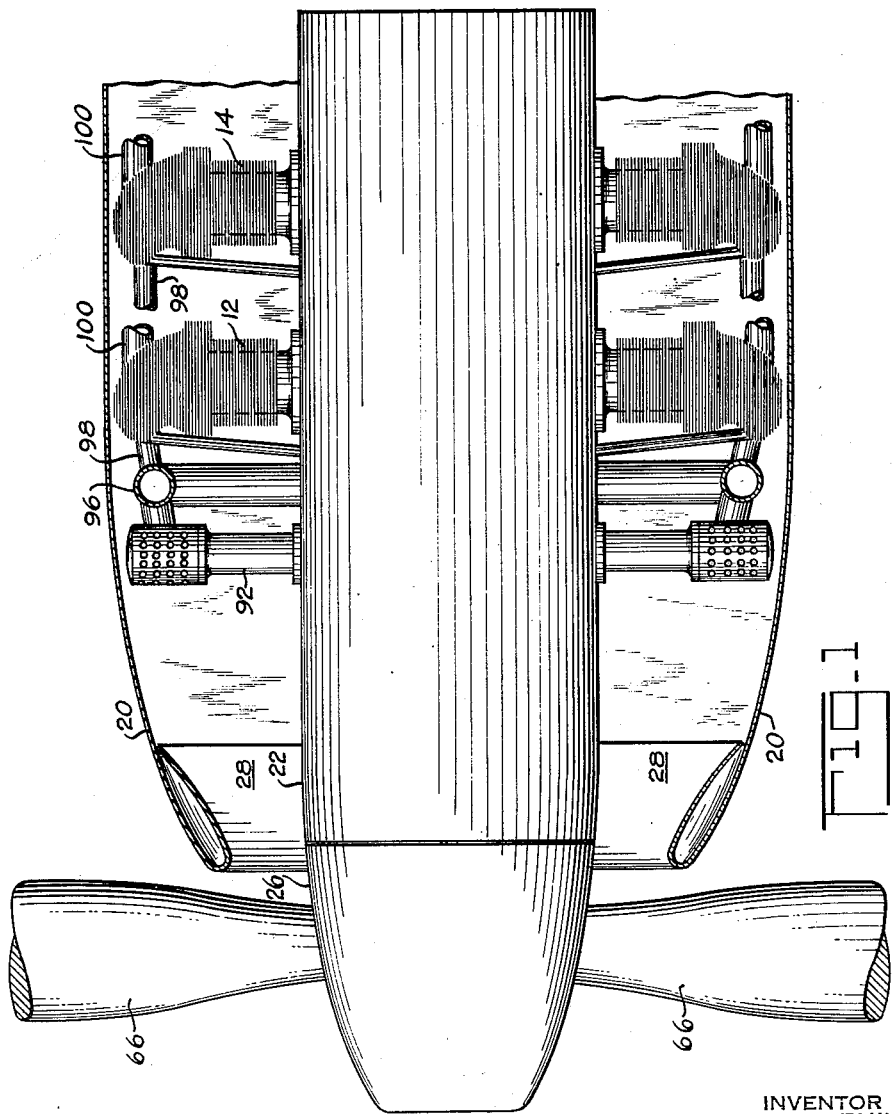
INVENTOR
ALLAN CHILTON
BY
ATTORNEY

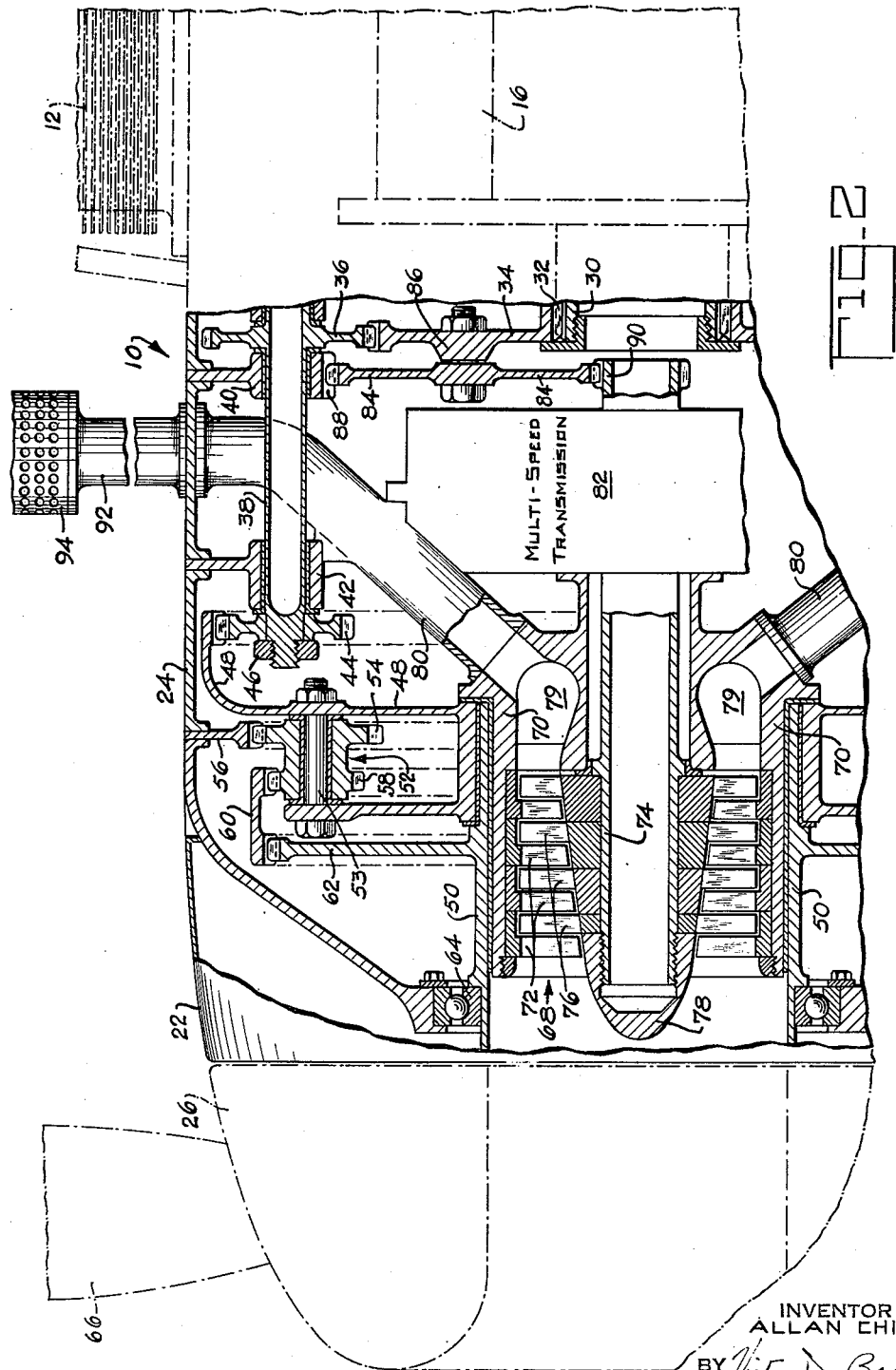

Patented Apr. 8, 1952

2,592,119

UNITED STATES PATENT OFFICE 2,592,119

AIRCRAFT ENGINE

Allan Chilton, Ridgewood, N. J., assignor to Curtiss-Wright Corporation, a corporation of Delaware Application July 11, 1947, Serial No. 760,334

11 Claims. (Cl. 123—119)

This invention relates to internal combustion engines and is particularly directed to a novel and improved arrangement of means for compressing the engine combustion air.

Modern reciprocating type internal combustion engines for aircraft are generally provided with engine driven superchargers disposed rearwardly of their associated engine. With this conventional arrangement, air for combustion within the engine flows rearwardly into a scoop and turns around 180° to flow forwardly into the engine driven supercharger from which it is distributed to the various engine cylinders which discharge their exhaust rearwardly. It is an object of this invention to provide a novel arrangement wherein the engine combustion air does not have the aforementioned tortuous flow path but, instead, the air for combustion within the engine flows rearwardly into a supercharger at the front of the engine from which it flows rearwardly to the engine cylinders and the cylinder exhaust discharges rearwardly therefrom. With this arrangement, a relatively straight-through airflow path is provided and the full ram pressure or total pressure head of the air relative to the engine can be provided at the entrance of the engine driven supercharger. To this end, the invention comprises an aircraft engine having a relatively large diameter propeller shaft with a forward open end and within which an engine driven supercharger is disposed for compressing air for engine combustion, said supercharger preferably comprising a multi-stage axial flow compressor.

A further object of the invention comprises a novel arrangement in which an engine driven supercharger supplies compressed air to the engine cylinders through ducts extending between fixed layshafts which transmit power from the engine crankshaft to the engine propeller shaft.

A still further object of the invention comprises a novel and simple installation of means for cooling the compressed air between the supercharger and the engine.

Other objects of the invention will become apparent upon reading the annexed detailed description in connection with the drawing, in which:

Figure 1 is a schematic view of an engine embodying the invention; and

Figure 2 is an axial sectional view through a portion of Figure 1.

Referring to the drawing, an air cooled engine 10 is schematically illustrated as comprising two rows of radially disposed cylinders 12 and 14. The cylinders of the two rows 12 and 14 are provided with the usual reciprocating pistons operatively connected to the crankpins 16 but one of which is shown in Figure 2 by conventional connecting rods (not shown). An annular cowl 20 is disposed about the engine, and the forward end of the cowl cooperates with concentric fairing means 22 extending forwardly from the engine crankcase 24 and with a propeller hub spinner member 26 to form a smooth annular entrance opening 28 for the engine cooling air.

The crankpins 16 form part of the engine crankshaft 30, the forward end of which is splined at 32 to a gear 34 which is disposed in meshing engagement with a plurality of circumferentially spaced gears 36. The gears 36 are formed integral with the rear ends of layshafts 38 journaled in fixed bearing diaphragms 40 and 42 rigidly connected to the engine crankcase structure 24. A gear 44 is secured to the forward end of each layshaft by a nut 46 and these gears 44 are drivably connected to a planetary pinion carrier member 48 piloted on a propeller shaft 50. The pinion carrier member 48 is provided with a plurality of circumferentially spaced double pinions 52 journaled about shafts 53 carried by the carrier member 48. Each double pinion 52 comprises a gear 54 meshing with an internal gear 56 rigidly secured to the crankcase structure 24 and a gear 58 splined by means of a member 60 to a gear 62 rigid with the propeller shaft 50.

With the afore-described construction, the engine crankshaft 30 is drivably connected to the propeller shaft 50 through speed reduction gearing comprising the circumferentially spaced layshafts 38 which transmit the crankshaft power to a planet pinion carrier 48 from which said power is transmitted to the propeller shaft 50. The propeller shaft 50 is journaled in a suitable bearing 64 carried by the forward end of the engine crankcase 24 and is drivably connected to the aircraft propeller 66 in the usual manner.

The propeller shaft 50 has a relatively large diameter and is hollow with an open forward end. A multi-stage axial compressor 68 is disposed within the hollow propeller shaft 50 for compressing the air entering through said forward open end. The axial compressor 68 comprises a fixed housing member 70 about which the rear end of the propeller shaft 50 is piloted and within which axially spaced sets of fixed inwardly-extending compressor stator blades 72 are rigidly secured. The rotor of the axial compressor comprises a shaft 74 about which axially spaced sets of outwardly-extending compressor rotor blades are rigidly secured, said sets of rotor blades alternating with and being disposed between said sets of stator blades in the usual manner. A streamlined cap 78 is disposed about the forward end of the compressor rotor or shaft 74. The arrangement is such that the axial compressor 68 is operable to compress air entering the propeller shaft 50 into an annular chamber 79 in the housing 70.

Secured to the rear of the housing 70 are a plurality of outwardly extending ducts 80 having their inner ends communicating with said annular chamber 79, the outer ends of said ducts being secured to the crankcase 24 whereby the rear of the housing 70 is supported from the crankcase by said ducts 80. Preferably, the number of ducts is equal to the number of layshafts 38 whereby each duct 80 extends outwardly between a pair of layshafts 38—for example, nine layshafts 38 and nine ducts 80 may be provided.

The compressor shaft 74 is drivably connected to the engine crankshaft 30 through a multi-speed transmission 82 and circumferentially spaced planet pinions 84. The planet pinions 84 are each journaled about pins 86 carried by the gear 34 and are disposed in mesh between a fixed internal gear 88 and a gear 90 comprising the input member of the multi-speed transmission 82 of which the compressor shaft 74 is the output member. The multi-speed transmission 82 may comprise any suitable means for providing a multi-speed drive for the axial compressor from the crankshaft 30 and, for example, may comprise a transmission similar to that illustrated in Patent No. 2,400,536 to Roland Chilton. As schematically illustrated, the housing for the transmission 82 is supported by the ducts 80.

The compressed air supplied by each duct 80 is fed into a duct 92 extending outwardly from the crankcase into a suitable radiator 94 for cooling the compressed air. The compressed air coolers or radiators 94 are circumferentially spaced and supported in front of the engine in the annular passage for the engine cooling air between the cowl 20 and the forward portion of the engine crankcase 24. From the coolers 94, the compressed air is supplied to an annular manifold 96 from which it is distributed to the various engine cylinders through intake pipes 98. Each cylinder exhausts rearwardly into exhaust pipes 100 which may discharge rearwardly directly into the surrounding atmosphere, or the exhaust gases from the pipes 100 may be collected in a convenient annular exhaust collector ring (not shown) from which the exhaust discharges rearwardly into the surrounding atmosphere. In addition, the exhaust from the engine cylinders may be transmitted rearwardly to suitable turbine means driven thereby—for example, as disclosed in applicant's co-pending application Serial No. 760,385, filed July 11, 1947.

With the afore-described construction, the pressure at the inlet of the supercharger 68 is substantially equal to the total pressure head of the surrounding air relative to the aircraft. In addition, the air does not have to turn forwardly to enter the supercharger as in the usual supercharger installation disposed at the rear of the engine. From the supercharger 68, the compressed air flows rearwardly and outwardly to the radiators 94 and then rearwardly to the engine cylinders from which the engine exhaust is discharged rearwardly through exhaust pipes 100 thereby providing a relatively straight-through flow path for the engine combustion air. In addition, location of the radiators 94 forwardly of the engine in the path of the engine cooling air provides a relatively simple and novel construction whereby the radiators 94 are easy to install.

The provision of an engine driven supercharger within the propeller shaft has been described in connection with a reciprocating type internal combustion engine. However, the invention is not so limited since this arrangement may be used in combination with any type of heat engine to which air is supplied for combustion.

While I have described by invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination; an aircraft engine; a hollow propeller shaft arranged to be driven thereby and having an open forward end providing an air intake opening; an engine driven supercharger disposed within the hollow of said shaft; and means providing a multi-speed drive from said engine to said supercharger.

2. In combination; an engine; a hollow shaft arranged to be driven by said engine, said shaft having an open forward end providing an air intake opening; a plurality of layshafts circumferentially spaced about the axis of said hollow shaft and providing a driving connection from said engine to said hollow shaft; and a plurality of ducts extending outwardly between said layshafts, each said duct communicating at one end with said hollow shaft and at its other end with said engine for supplying said engine with air for combustion therein.

3. In combination; an aircraft engine; a hollow propeller shaft having an open forward end providing an air intake opening; means including a plurality of layshafts circumferentially spaced about the axis of said propeller shaft and providing a driving connection from said engine to said propeller shaft; an engine driven supercharger disposed within the hollow of said shaft for compressing air entering therein; and a plurality of ducts extending outwardly from said supercharger between said layshafts for supplying compressed air from said supercharger for combustion within said engine.

4. In combination; an aircraft engine; a cowl disposed about said engine and providing a forwardly directed passage for the engine cooling air; a hollow propeller shaft drivably connected to said engine and having an open forward end providing an air intake opening; an engine driven supercharger disposed with the hollow of said shaft forwardly of said engine for compressing air entering said shaft; a radiator disposed in said passage; a duct extending outwardly from said supercharger and supplying compressed air from said supercharger to said radiator for cooling said compressed air; and means for supplying said cooled compressed air from said radiator to said engine for combustion therein.

5. In combination; an aircraft engine; a cowl disposed about said engine and providing a forwardly-directed passage for the engine cooling air; a hollow propeller shaft having an open forward end providing an air intake opening; means including a plurality of layshafts circumferentially spaced about the axis of said propeller shaft; an engine driven supercharger disposed within the hollow of said shaft for compressing air entering said shaft; radiator means disposed in said passage; a plurality of ducts extending outwardly from said supercharger between said layshafts and supplying compressed air from said supercharger to said radiator means for cooling said compressed air; and means for supplying said cooled compressed air from said radiator means to said engine for combustion therein.

6. In combination; an aircraft engine; an annular cowl disposed about said engine and providing a forwardly-directed annular passage for the engine cooling air; a hollow propeller shaft having a forwardly-directed air intake opening; means including a plurality of layshafts circumferentially spaced about the axis of said propeller shaft; an engine driven supercharger disposed within the hollow said shaft for compressing air entering said shaft; a plurality of circumferentially-spaced radiators disposed in said annular passage; a plurality of ducts extending outwardly from said supercharger between said layshafts and supplying compressed air from said supercharger to said radiators for cooling said compressed air; and means for supplying said cooled compressed air from said radiators to said engine for combustion therein.

7. In combination; an engine having a fixed housing; a hollow shaft extending from said housing and being drivably connected to said engine for rotation thereby; a supercharger disposed within the hollow of said shaft and drivably connected to said engine for rotation at a speed differing from that of said shaft; and duct means extending from said supercharger for supplying the air compressed by said supercharger to said engine, said duct means being secured to the fixed housing structure of the engine.

8. In combination; an engine having a fixed housing; a hollow shaft drivably connected to said engine for rotation thereby, said hollow shaft extending forwardly from said housing and having an open forward end providing an air intake opening; and a supercharger disposed within the hollow of said shaft, said supercharger including a fixed housing secured to said engine housing and about which said shaft is piloted and including a rotatable portion drivably connected to said engine for rotation at a speed differing from that of said shaft.

9. In combination; an aircraft engine having a fixed housing; a hollow aircraft propeller shaft drivably connected to said engine for rotation thereby, said hollow propeller shaft extending forwardly from said housing and having an open forward end providing an air intake opening; and a supercharger disposed within the hollow of said shaft, said supercharger including a fixed housing secured to said engine housing and about which said hollow shaft is piloted and including a rotatable portion drivably connected to said engine for rotation at a speed differing from that of said shaft.

10. In combination; an aircraft engine having a fixed housing; a hollow aircraft propeller shaft drivably connected to said engine for rotation thereby, said hollow propeller shaft extending forwardly from said housing and having an open forward end providing an air intake opening; a supercharger disposed within the hollow of said shaft and drivably connected to said engine for rotation at a speed differing from that of said shaft; and duct means extending from said supercharger for supplying the air compressed by said supercharger to said engine, said duct means being secured to the fixed housing of said engine.

11. The combination recited in claim 10 in which said supercharger comprises a multi-stage axial flow compressor.

ALLAN CHILTON.

REFERENCES CITED

The following references are of record in the file of this patent:

UNITED STATES PATENTS

| Number | Name | Date |
|---|---|---|
| 1,408,753 | Long | Mar. 7, 1922 |
| 1,762,437 | Franklin | June 10, 1930 |
| 2,357,778 | Beaven | Sept. 5, 1944 |
| 2,416,389 | Heppner | Feb. 25, 1947 |

FOREIGN PATENTS

| Number | Country | Date |
|---|---|---|
| 130,414 | Great Britain | Aug. 7, 1919 |